(12) United States Patent
Overy et al.

(10) Patent No.: US 6,961,541 B2
(45) Date of Patent: Nov. 1, 2005

(54) METHOD AND APPARATUS FOR ENHANCING SECURITY IN A WIRELESS NETWORK USING DISTANCE MEASUREMENT TECHNIQUES

(75) Inventors: Michael Robert Overy, Medstead (GB); Michael James Sullivan, Belmont, CA (US)

(73) Assignee: AeroScout, Inc., Rehovot (IL)

( * ) Notice: Subject to any disclaimer, the term of this patent is extended or adjusted under 35 U.S.C. 154(b) by 513 days.

(21) Appl. No.: 10/156,244

(22) Filed: May 24, 2002

(65) Prior Publication Data

US 2003/0220765 A1   Nov. 27, 2003

(51) Int. Cl.[7] ............................................... H04B 5/00
(52) U.S. Cl. ..................... 455/41.2; 455/410; 380/247; 380/270; 713/168
(58) Field of Search ..................... 455/410, 411, 41.2, 455/41.3; 713/168; 380/247, 270

(56) References Cited

U.S. PATENT DOCUMENTS

| | | | |
|---|---|---|---|
| 6,577,274 B1 | 6/2003 | Bajikar | |
| 6,700,475 B1 * | 3/2004 | Geber et al. | 340/5.61 |
| 2002/0016153 A1 * | 2/2002 | Sato et al. | 455/41 |
| 2002/0086640 A1 | 7/2002 | Belcher et al. | |
| 2002/0098852 A1 | 7/2002 | Goren et al. | |
| 2002/0115426 A1 * | 8/2002 | Olson et al. | 455/410 |
| 2002/0164997 A1 | 11/2002 | Parry | |
| 2003/0065918 A1 * | 4/2003 | Willey | 713/168 |

FOREIGN PATENT DOCUMENTS

WO   WO 01/61883 A2   8/2001

* cited by examiner

Primary Examiner—Lee Nguyen
(74) Attorney, Agent, or Firm—A. Mitchell Harris; Jeffrey D. Moy; Weiss, Moy & Harris, P.C.

(57) ABSTRACT

A method and apparatus for enhancing security in a wireless network using distance measurement techniques provides an additional layer of security and privacy in wireless communications. A distance measurement or location-finding is performed between two devices by transmitting and receiving one or more signals and computing a distance between the two devices or a location of a connecting device. The resulting computed distance or location is used to determine whether or not to permit pairing, secure connection or secure transactions between the two devices. The computed distance or location can be further used in combination with a signal strength measurement to link to locate and measure nearby devices first, reducing the time required to initialize network communications. Management software may be enhanced to facilitate connecting to desired devices by providing an indication of computed distance or location of each device, and a list may be generated in order of proximity, further facilitating connection to the desired devices. Set-up of wireless networks may automated by using a short distance to facilitate connection between nodes.

31 Claims, 5 Drawing Sheets

METHOD AND APPARATUS FOR ENHANCING SECURITY IN A WIRELESS NETWORK USING DISTANCE MEASUREMENT TECHNIQUES

CROSS-REFERENCE TO RELATED APPLICATIONS

The present application is related to previously-filed United States patent applications assigned to the same assignee: "DISTANCE MEASURING METHOD AND APPARATUS USING RF MODULATED ELECTROMAGNETIC WAVES IN WIRELESS APPLICATIONS", Ser. No. 09/548,732, filed Apr. 13, 2000; "ACCURATE DISTANCE MEASUREMENT USING RF TECHNIQUES", Ser. No. 09/759,601 filed Jan. 16, 2001; "SYSTEM AND METHOD FOR REDUCING MULTIPATH DISTORTION IN WIRELESS DISTANCE MEASUREMENT SYSTEMS", Ser. No. 09/759,600, filed Jan. 16, 2001; "DISTANCE MEASUREMENT USING HALF-DUPLEX RF TECHNIQUES", Ser. No. 09/759,602, filed Jan. 16, 2001; and "METHOD AND SYSTEM FOR DISTANCE MEASUREMENT IN A LOW OR ZERO INTERMEDIATE FREQUENCY HALF-DUPLEX COMMUNICATIONS LOOP", Ser. No. 10/137,954, filed May 2, 2002. The specifications of the above-referenced U.S. patent applications are herein incorporated by reference.

BACKGROUND OF THE INVENTION

1. Field of the Invention

The present invention relates generally to communications loops, and more specifically, to a method and system for providing enhanced loop security by measuring a distance between transceivers.

2. Background of the Invention

A multitude of wireless communications systems are in common use today. Mobile telephones, pagers and wireless-connected computing devices such as personal digital assistants (PDAs) and laptop computers provide portable communications at virtually any locality. In particular, BLUETOOTH devices provide a wireless network operating in the 2.4 GHz Industrial Scientific and Medical band (BLUETOOTH is a trademark of Bluetooth SIG, Inc., which is an acronym for Bluetooth Special Interest Group—a consortium of wireless device manufacturers). Wireless local area networks (WLANs) and wireless personal area networks (WPANs) according to the Institute of Electrical and Electronic Engineers (IEEE) specifications 802.11 (WLAN), 802.15.1 (WPAN) and 802.15.4 (WPAN-LR) also provide wireless interconnection of computing devices and personal communications devices, as well as other devices such as home automation devices.

Within the above-listed networks and wireless networks in general, privacy and security are increasingly necessary as devices connected to such wireless networks control critical systems, funds transactions and may contain and exchange confidential information. Wireless networks generally fall within one of two categories: "ad-hoc networks" or "infrastructure networks". Ad-hoc wireless networks permit connection of devices on an ad-hoc basis wherein devices may enter the range of the wireless network and thereby connect to other devices. Pre-configured infrastructure wireless networks typically permit connection of only authorized devices that are part of the infrastructure known by information stored in a database during network configuration.

Security in an ad-hoc network is difficult to establish, as the only presently available means for uniquely identifying a device is the device name and address, which in many cases can be easily impersonated. Further, since the motivation behind ad-hoc connectivity is ease of connection for devices that are not part of a pre-configured infrastructure, the use of names or addresses to block a connection may not be desirable in general. Security in an infrastructure wireless network is easier to implement, as the device names and addresses are known and key information may be exchanged during network set-up, providing a means for securing the connection of an infrastructure device after an initial set-up. However, infrastructure devices are still subject to impersonation based on interception (reception) of the connection information during the set-up process.

Security protocols in use to protect the set-up process or connection of an ad-hoc device include passwords, verification of device types and names that are typically used in conjunction with key exchange protocols or in the generation of the keys. The establishment of the connection is followed by secured communications encrypted and decrypted using resulting keys. While encryption and decryption can provide very secure communications, key exchange during network setup or ad-hoc connection is a primary weak link in the overall security measure. If an unauthorized device is in the vicinity of a wireless network, it may monitor the network during a key exchange period and retain the information for subsequent connection by impersonating a legitimate device. Further, devices that are not hostile, but are undesired for connection, may accidentally connect during network set-up or as ad-hoc devices if they are within communications range of the network.

Techniques to reduce the possibility of unauthorized or accidental connection generally complicate the setup of wireless networks. A network user or administrator may be required to enter a password or Personal Identification Number (PIN) at the connecting device or a pair of devices, but manual password or PIN entry is tedious and time-consuming and the password may be compromised or hacked. Also, for ad-hoc connections generation or agreement on a unique PIN is generally inconvenient. For infrastructure networks, manually entered keys or digital certificates may be used that are retained in the device, but they are also subject to being compromised and reduce the flexibility of installing new devices on the network or replacing devices already connected. Also, if communications based on the passwords, PINs or digital certificates are intercepted during the connection process, those security measures may be bypassed by using the intercepted key exchange information. "Man-in-the-middle" attacks can be used to "fool" a pair of devices that are attempting to exchange keys. The result of this type of attack is that the intruding device exchanges keys with each of the pair of devices. The intruding device can retain all of the exchanged key information and may modify a transaction, for example to transfer a larger monetary amount from a payor into an alternative fund, while transferring the intended amount from a payor to the intended payee.

In the BLUETOOTH network security model, a combination key mechanism is used that generates an encryption/decryption key from stored passkeys within a pair of devices. When the devices are "paired" (e.g., connected during network setup), if a rouge device is present during pairing, the combination key for access to the devices or link establishment can be acquired. Also, if the passkey space is short, the access may be hacked by calculating the combination keys from guesses at the passkey and comparing them to the received combination keys or attempting to establish a link with a device based on passkey guesses.

In general, secure setup of a wireless network comprises a tradeoff between ease of setup and weakness of security and no matter how complicated the setup process, security can still be compromised. The only information available for uniquely verifying a BLUETOOTH device is its name, class and address, which may be easily copied. Security improvement requires complex manual user intervention such as isolating the devices during pairing.

Further, ad-hoc connection of unknown devices to wireless networks is desirable in many applications, such as automated teller machine (ATM) connections for transactions with a wireless payment or ticketing device or a personal computing device. Although many transactions require supplemental authentication such as password or personal identification number (PIN) entry, it is desirable to eliminate the need for these additional authentication measures.

Therefore, it would be desirable to provide a method and apparatus for enhancing security in a wireless network that does not increase a level of user intervention and provides a level of security that is not compromised by interception of connection information.

SUMMARY OF THE INVENTION

The above objective of enhancing security in wireless networks is achieved in a method and apparatus. The method is embodied in an apparatus that establishes a wireless connection between an initiating device and a responding device by computing a distance or location of the responding device in conformity with a channel time delay between the responding device and one or more receivers. At least one of the receivers may be located within the initiating device or one or more of the receivers may be external to the initiating device. If the computed location indicates that the responding device is a desired device, a secure connection is then established between the initiating device and the responding device.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
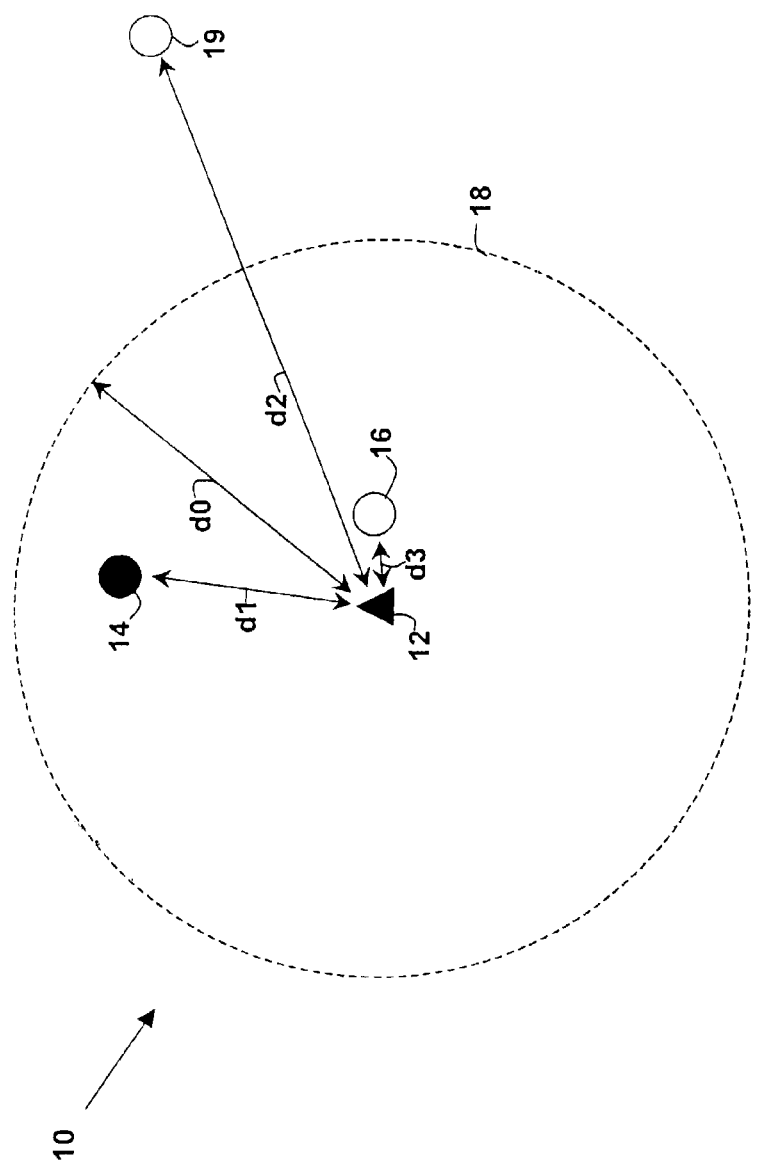
FIG. 1 is a pictorial diagram depicting a wireless network in which an embodiment of the invention is practiced.

The present invention provides enhanced security within a wireless network such as a WLAN (e.g., IEEE 802.11) or WPAN network (e.g., as BLUETOOTH) network, by adding a device location criterion to the network security model. Wireless network devices may be enhanced to provide a measurement of the location or distance between connected devices without adding a separate infrastructure as is required with systems such as the Global Positioning System (GPS), thereby providing distance measurement with low incremental cost. Alternatively, a separate infrastructure may be added for providing device location information and the location information used to provide the additional security information. Ultra Wideband (UWB) technologies as proposed by the UWB working group includes precision measurement of pulse arrivals, providing direct distance measurement information (or location information using multiple receivers) that may be used in conjunction with the present invention to provide verification of physical location of a connecting device. Since the pulse arrival timing forms part of the communications reception structure, addition of distance measurement may be performed without adding device or complexity or communications overhead and some proposed UWB devices include distance measurement capability.

As described in the above-incorporated patent applications, the above-listed portable devices as well as other communication systems may be enhanced to provide distance measurement capability within portable or stationary wireless devices. The techniques described in the above-incorporated patents introduce distance measurement capability within transceivers that are synchronized or unsynchronized and full-duplex or half-duplex.

Another distance-measuring technique is Location Finding (LF), in which multiple receivers correlate the time-difference-of-arrival (TDOA) of signals received from a transmitting source. The location of the transmitting source can be determined by triangulation based on the timing between the signal arrivals at the multiple receivers. LF and other techniques are well known in the art for providing wireless device location information and may be used within the method and system of the present invention to provide the location information on which the security models of the present invention use to verify the desirability of providing a network connection to a wireless device.

Security within a communications loop is typically provided by a mechanism such as encryption/decryption of the transmitted/received signal. The initialization of the link usually includes a key exchange (or agreement) mechanism, whereby subsequent communications are secured by encryption in conformity with the exchanged keys and decryption in conformity with retained keys. However, during the set-up of a link or during connection within communications networks that permit connection of devices having no previous security relationship (ad-hoc connection), information used to generate or exchange secret keys (connection information) may be intercepted, compromising the security of the connection.

Devices that provide passive physical access such as electronic automobile keys and passcards are especially subject to so-called "man-in-the-middle" attacks. Newer versions of these electronic devices provide "hands-free" operation by enabling physical access any time an activation key is brought within proximity of the lock, rather than requiring the user to press a button or perform a similar activation action. If a pair of relay RF devices are used to convey signals between the access location (lock) and a person bearing a valid activation key, no matter what separation distance is actually present, the relay devices can open the lock. Distance measuring or location finding techniques can be used to eliminate this security hole, as the loop delay through the relay devices plus the delay from the relay devices to the lock and activation key will exceed a maximum distance set for security purposes.

Referring now to the figures and in particular to FIG. 1, a wireless network 10 within which the present invention is embodied is depicted in a pictorial diagram. A plurality of wireless devices 12, 14, 16, 19 may inter-communicate via radio-frequency (RF) signals. Wireless device 12 represents a Master device, connection node or server node through which other wireless devices may connect to the wireless network. The devices represented in solid black are "desired" connections, while the devices represented in white by outlines are "undesired" connections.

One embodiment of the present invention uses distance measuring techniques to establish a secure perimeter 18. By measuring the distance between node 12 and inter-communicating devices, undesired device 19 outside of the perimeter can be excluded by determining that distance d2 exceeds distance d0, which is the maximum permitted connection distance.

Other embodiments of the invention use a measured distance between devices to determine whether or not the measured distance between devices conforms to a pre-programmed distance or to permit manual/visual verification of a measured distance between devices before establishing a connection. For example, although device 16 is within perimeter 18, the connection from node 12 to device 16 can be disallowed by displaying distance d3 in a prompt to a user or a network administrator, providing manual control of a connection to device 16. The connection to device 14 may be established automatically by determining that distance d1 corresponds to the location of desired device 14 either automatically by comparison to a pre-programmed distance or by manually verifying distance d1.

In yet another embodiment of the present invention, a very short distance (for example 0.3 meters) may be used to set a threshold for device pairing. Automatic pairing can be initiated when a device is brought within the pairing distance threshold (0.3 m). In each of the above-described embodiments, a device which does not allow distance measurement is considered to be out of any predefined range. Short-range distances can also be used for adding auto-connection security to previously unpaired devices. When such devices are brought within the short-range security perimeter, connection can be automatically established. Auto-connection security using distance measurement may provide, for example, additional security to a visually verified transaction.

Figure 2:
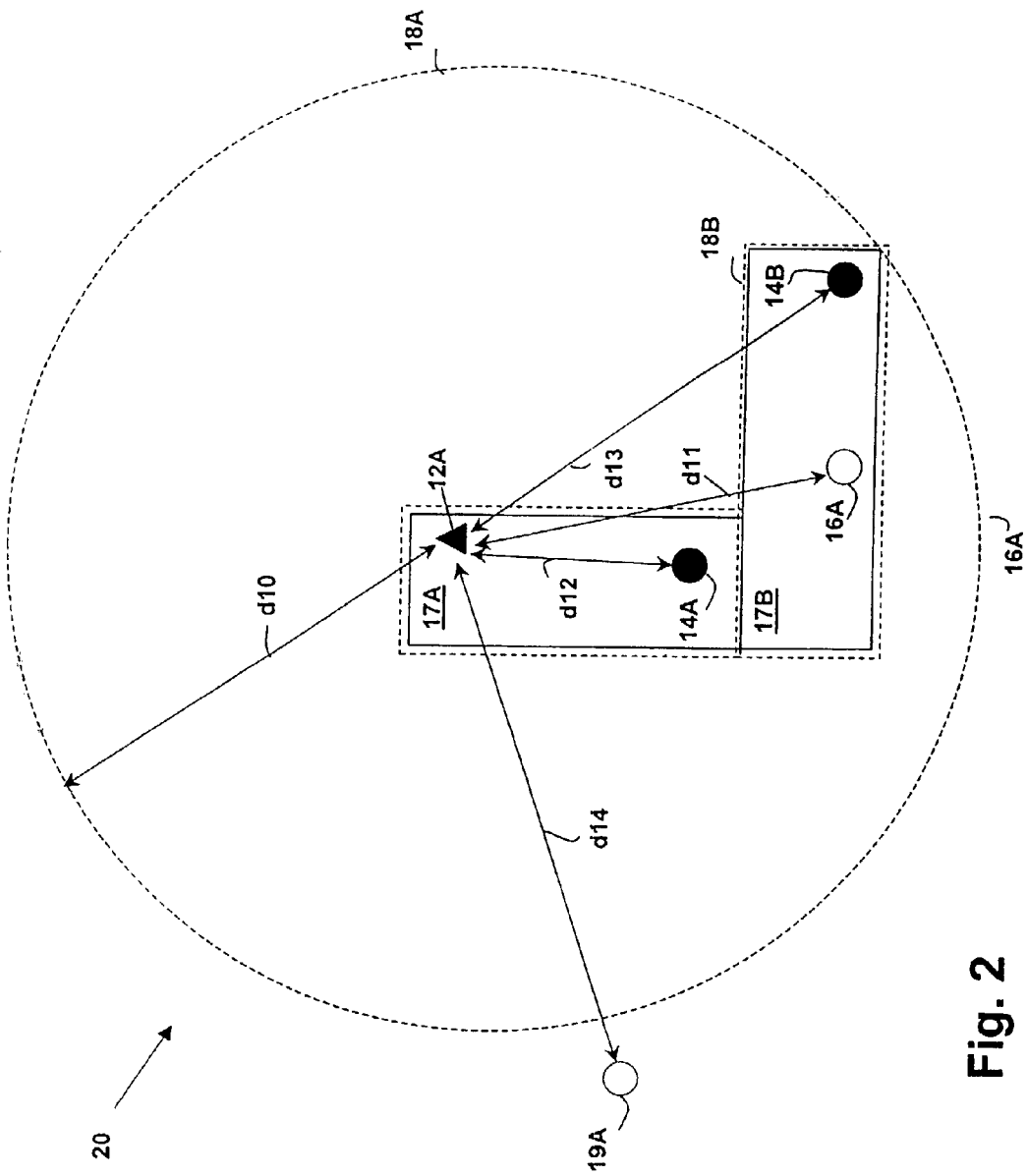
FIG. 2 is a pictorial diagram depicting a wireless network in which another embodiment of the invention is practiced.

Referring now to FIG. 2, a pictorial diagram of a wireless network 20 according to another embodiment of the invention is depicted. Network 20 includes another level of security to the location or distance criterion security model by using a facility map in conjunction with the distance or location measurement. For location measurement (e.g., triangulation to determine exact position of a connecting device), the facility map can be compared to determine precisely whether or not a device is present in a particular room, group of rooms or within a secured facility. For distance measurement, the measured distance can be used to determine a reasonable estimate of whether or not a device is within a particular room or facility.

Wireless device 12A represents a connection node to which devices 14A, 14B, 16A and/or 19A may be connected. Devices 12A 14A, 14B and 16A are located within a facility comprising room 17A and room 17B. For distance measurement, a circular secure perimeter 18A is set to include room 17A and 17B and includes area that is not within the facility. If location finding rather than distance measurement is used, it is possible to implement a secure perimeter 18B that conforms to the actual layout of the facility. For illustrative purposes, operation of the system will be described with respect to circular security perimeter 18A. Undesired device 19A is located outside of secure perimeter 18A and thus connection may be denied as described above with respect to the operation of network 10. Undesired device 16A, however, is denied connection because device 16A is registered for connection only within room 17A and location calculation has determined that device 16A is located within room 17B (or outside of the facility altogether). The above example shows an embodiment of the present invention that uses a facility map in conjunction with distance measurement, but other configurations combining either distance measurement or locating finding with facility mapping may be implemented so that the facility information is used in conjunction with the location information to provide detailed exclusion of undesired connections both within and without a facility.

Figure 3:
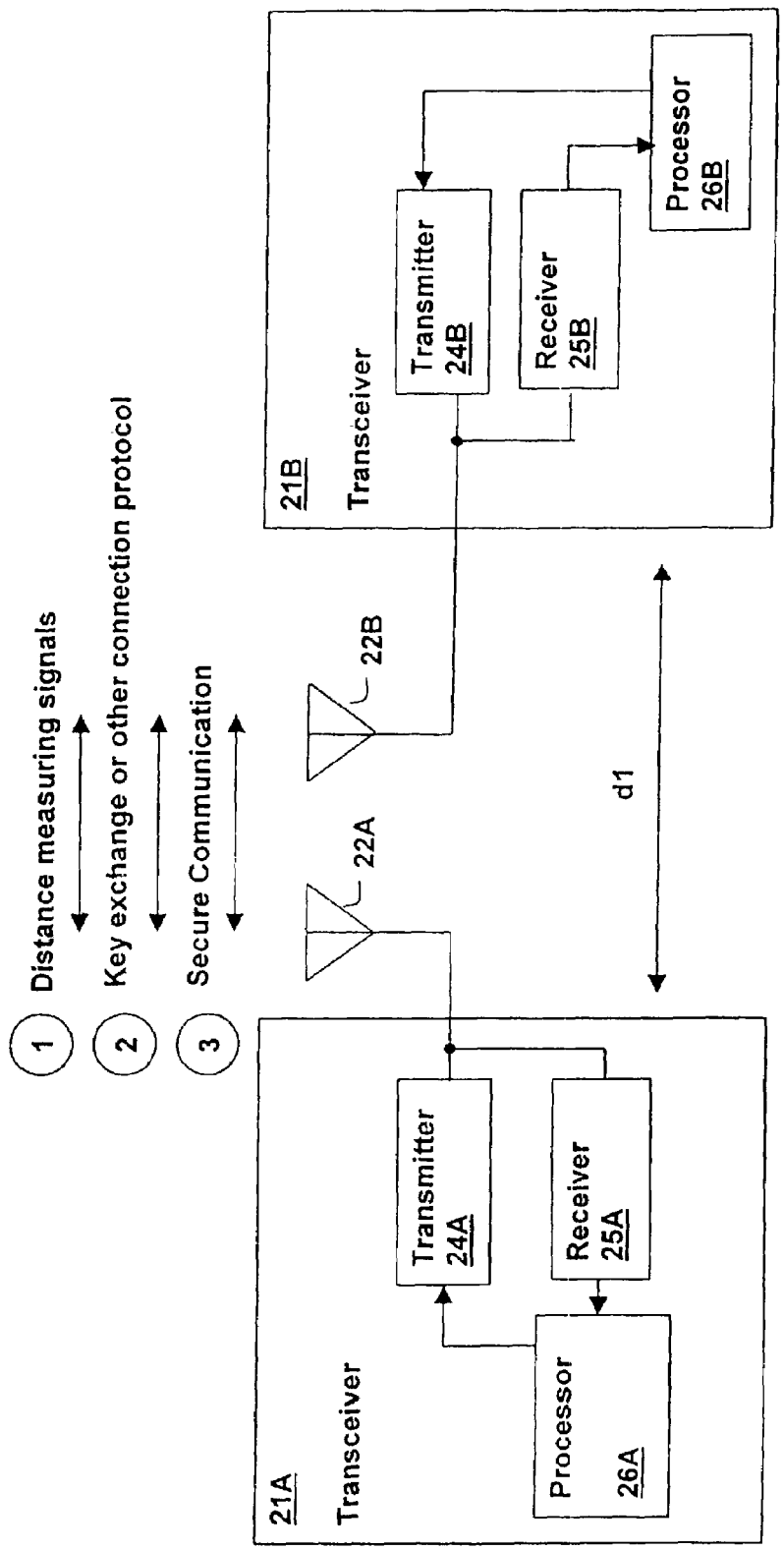
FIG. 3 is a block diagram depicting a communications loop within which the present invention is embodied.

Referring now to FIG. 3, a communications loop within which the present invention is embodied is depicted in a block diagram. Wireless devices 21A and 21B may be mobile telephones, personal digital assistants (PDAs), headsets, laptop computers with wireless modems, pagers, or other portable or non-portable network devices that include wireless communications capability. Some devices in the associated wireless network may be receive-only or broadcast only, but in order to implement the distance measuring techniques of the present invention, a pair of transceivers is used, as a signal must be transmitted from an initiating device to a responding device and a second signal is then returned from the measured device. Location finding techniques may be performed on transmit-only devices by observing the TDOA between other receivers when the transmit-only device transmits. For transmit only devices, secure key exchange protocols are not possible, so the distance measuring or location finding criteria are especially important to enhance security if a transmit-only device is permitted to introduce information to a wireless network.

Wireless devices 21A–21B are transceivers capable of communicating using a common protocol and frequency band of operation. For example, transceivers 21A–21B may be BLUETOOTH devices communicating in a band centered around 2.4 GHz and having a bandwidth of approximately 80 MHz. 79 channels are provided with a 1 MHz bandwidth each, and the devices frequency hop at a rate of 1600 hops per second. A complete protocol, including communications control protocols and transport layer protocols are defined by the BLUETOOTH specification, providing a complete wireless networking solution. While the BLUETOOTH specification is of particular interest in wireless networking, it should be understood that the techniques of the present invention apply to wireless networks in general.

Each of transceivers 21A and 21B include a transmitter 24A, 24B a receiver 25A, 25B an antenna 22A, 22B and a processor 26A and 26B, processors 26A and 26B include necessary memory such as RAM or ROM for storing program instructions and data for execution on a microcontroller, microprocessor or a general purpose computer system for implementing methods in accordance with embodiments of the present invention. For example, transceiver 21A may be a wireless network server node comprising a wireless modem coupled to a server having random access memory (RAM) and disk storage for storing, retrieving and executing a network management application having a database of infrastructure connected wireless devices, including a database of pre-programmed distances for comparison to measured distances in accordance with an embodiment of the present invention. Transceiver 21B may be a PDA attempting to connect to a server through transceiver 21A. While either static or mobile devices may initiate connection, and either device may perform the distance measurement, for illustrative purposes, server transceiver 21A polls for new devices serving as the initiating device and PDA transceiver 21B responds as the responding device. Through measuring the loop delay, processor 26A can estimate the distance to PDA transceiver 21B and determine whether or not to permit a connection to PDA transceiver 21B in conformity with a stored distance value that may be a security perimeter or a pre-programmed distance. If the distance indicates that PDA transceiver 21B is a "desired" connection, key exchange and subsequent secure communication may be established.

The above-described example illustrates an ad-hoc connection using distance measurement or location finding as a security criterion. For an infrastructure connection, transceiver 21A may verify that information provided by transceiver 21B corresponds to a known device and processor 26A may verify that the distance 21B corresponds to an expected distance for transceiver 21B. Other variations may be of advantage, such as using the distance measurement within a mobile device such as PDA transceiver 21B to verify that PDA transceiver 21B is connecting to a desired wireless network, in which case processor 26B would verify that server transceiver 21A is located at an expected distance from transceiver 21B.

The present invention may measure distance using techniques similar to those described in the above-incorporated patent applications, wherein the slope of phase versus frequency as measured around a communications loop and over a plurality of frequencies is used to determine the distance between a pair of transceivers. The ambiguities due to an unknown number of wavelengths between the transceivers and due to multipath distortion is resolved by the use of multiple frequency measurements. Alternatively, or in concert, the present invention may measure location using triangulation among two or more devices to determine the relative position of a responding device.

In general, there are three phases that are used to provide security within the present invention: 1) measurement of distance or location, 2) Key exchange or other security protocol, and 3) secure communication after key exchange. Variations on the phases above may also be used. For example, key exchange may be used only on initial network setup, while distance or location verification is used periodically, on link establishment or for authentication/verification in subsequent sessions. Also, under some circumstances, secure communications may not be used at all, but a distance or location measurement used to exclude a device (for example, rejection of a connection to an incorrect wireless mouse or keyboard between neighboring computer workstations).

Further security can be provided for devices that have already established a connection by encrypting/decrypting the distance measurement or location finding signals. The DM/LF signals may be encrypted using a secret that both sides share after initial pairing that is not relayed through the communications channel. Such a secret can be a random internal timing, hopping sequence or some other internal parameter. A random parameter is derived from a "key number" that the master transmits to the slave and is known only to both of them, or using a "rolling code" technique similar to the rolling code used for security in present-day RF automotive remote lock/alarm activation devices.

While very sophisticated techniques are required to generate a false distance measurement or location, it is possible to generate such signals. Since the distance measurement or location finding signal is transmitted and received over a very short interval (generally the signal occupies half of a time slot for each direction of transmission), brute-force attempts to simulate encrypted distance measurement signals will not succeed, due to a lack of computation time.

Also, for connections such as electronic funds transactions, the distance measurement or location finding may be performed only when a user initiates a transaction. The above-described implementation makes it possible to establish access without a verified distance for services such as menu and information browsing, but providing physical location verification for sensitive transactions, in particular transactions subject to non-repudiation requirements. In addition to electronic funds transactions, transactions using digital signatures or certificates may be further secured by the techniques of the present invention. For example, privacy/security and validity confidence of an electronic execution of a contract document using a personal transaction protocol (PTP) that includes a digital signature may be enhanced by verifying physical location and the physical location information may also be embedded in the transaction record along with time and date stamping or stored in a separate record referenced to the transaction. Security may also be enhanced through a token authentication method wherein a second device registered to or owned by the same user is used to provide additional assurance that the intended person is executing the transaction.

Figure 4:
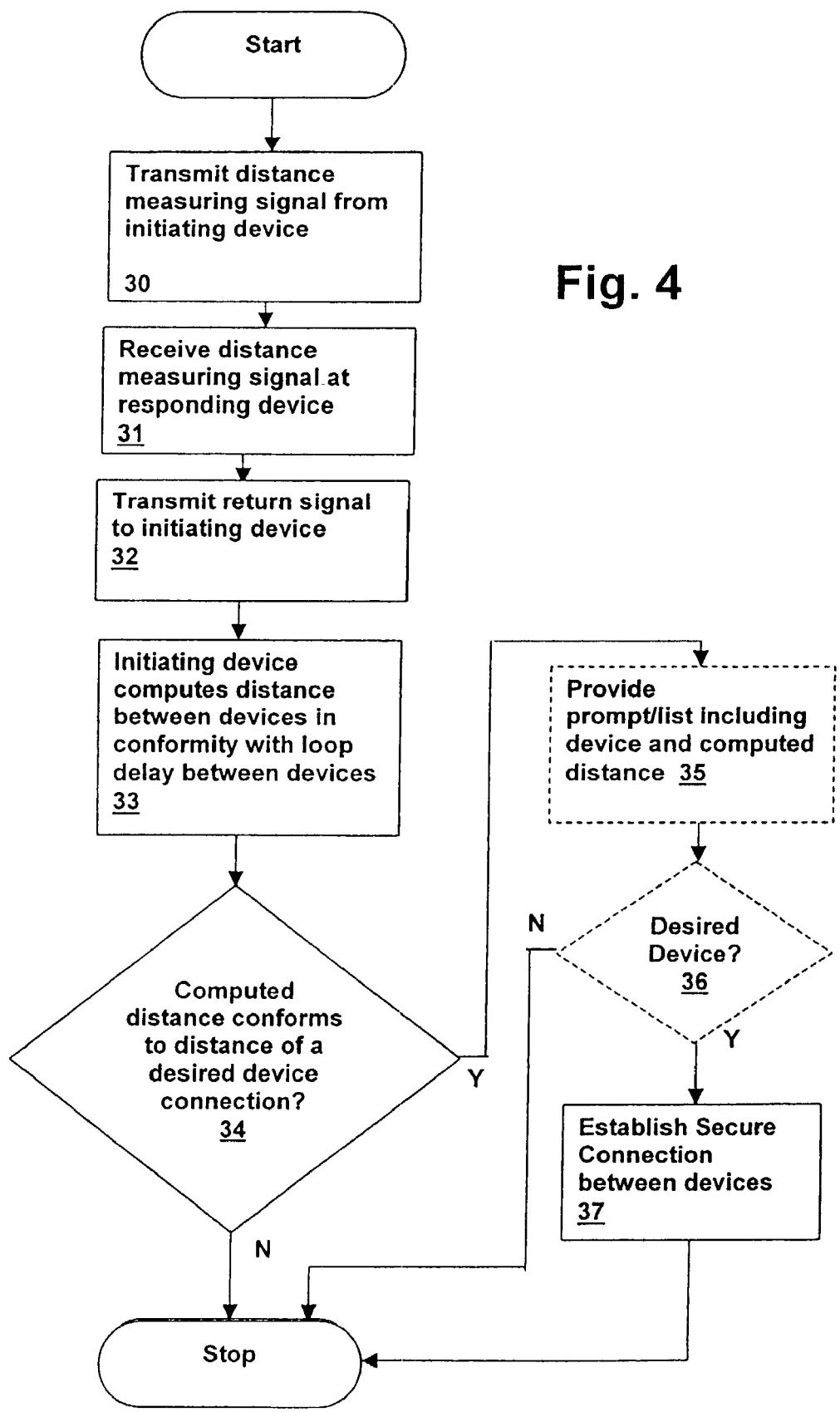
FIG. 4 is a flowchart depicting a method in accordance with an embodiment of the invention.

Referring now to FIG. 4, a method in accordance with an embodiment of the present invention is depicted in a flowchart. First, a distance measuring signal is transmitted from an initiating device (step 30) and a responding device receives the distance measuring signal (step 31). A return signal is transmitted to the initiating device (step 32) and the initiating device computes the distance between the devices in conformity with the loop delay between the devices (step 33). In general, it is necessary to repeat steps 30–32 for a set of differing frequencies (as is described in the above-incorporated patent applications) in order to resolve ambiguities in the time delay-distance calculation. For illustrative purposes, the description of the technique includes receiving and transmitting a single signal, but should be understood to contemplate multiple discrete frequency measurements or a continuously varying measurement. With respect to LF techniques, a single frequency or multiple frequencies may be used, depending on the number of receivers used to triangulate the distance, as in LF techniques, ambiguities may be resolved by resolving the measured delays over multiple receivers. If the computed distance conforms to the distance of a desired device connection (decision 34), a prompt list may be generated to a user (optional step 35) and the user permitted to verify whether or not the responding device is a desired device (optional step 36) and then in response to a positive used indication in step 36 or an automatic connection after step 34, a secure connection is established (step 37).

Figure 5:
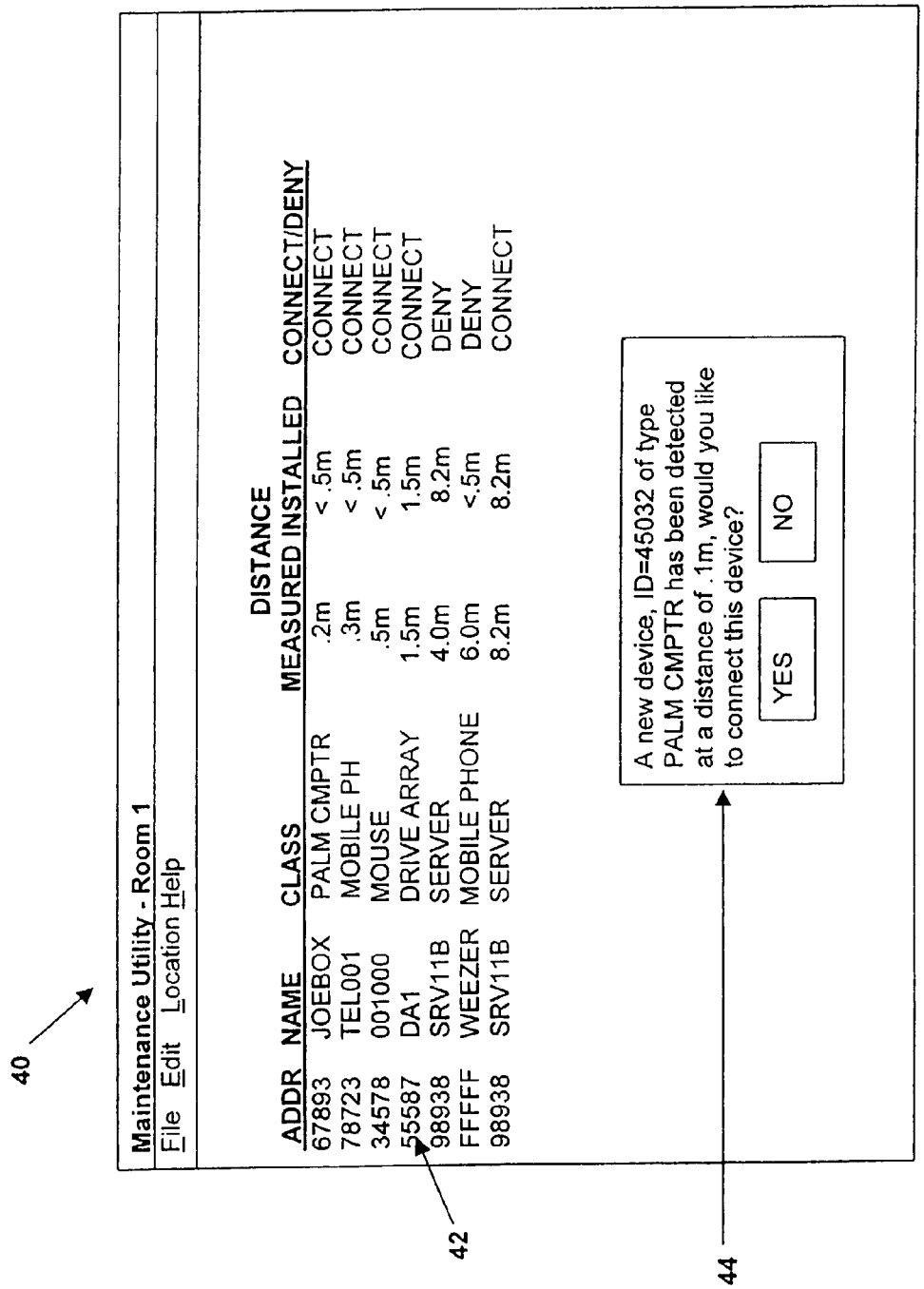
FIG. 5 is a pictorial diagram depicting a graphical output of a software application in accordance with an embodiment of the invention.

The use of a list/prompt to permit a network administrator or user to verify a device connection is especially useful in organizing a large wireless network wherein hundreds of wireless devices may be "seen" by the network. Referring now to FIG. 5 a graphical output 40 of a network management application is depicted in accordance with an embodiment of the invention. Graphical output 40 displays a list of devices that may be organized in order of increasing distance from a wireless server connection point making it easier to view desired local devices and ignore more remote devices that are generally unconnected. The list may be segregated into screens for particular rooms, facilities or local networks. List 42 shows address, name, device class, and distance/connection information for a plurality of devices. Reading down the list, a palm computer, a mobile telephone and a mouse are connected as they have met a short distance threshold for any local device (<0.5 m). A drive array DA1 is connected as the measured distance matches the installed distance (1.5 m). A connection to device indicating that is server SRV11B is denied, as the installed distance is 8.2 m and the measured distance is 4.0 m. A mobile telephone at 6 meters is likewise denied as the criterion for mobile telephones is set to 0.5 m. A server SRV11B is connected at the expected distance of 8.2 m.

List 42 depicted in graphical output 40 provides an indication of connection status and indicates anomalies such as the two entities representing themselves as SRV11B, as well as a distance location. Location information provided by LF may be displayed as coordinates or in a graphical map, permitting verification of device location for connecting devices.

A prompt 44 indicates that the server has located another wireless device at a distance or location within connection range and offers the user an opportunity to deny the connection. Many other variations in graphical output and automatic vs. user prompted manual operation are possible and graphical output 44 is provided only as an example of a management tool that benefits from the enhancements of the present invention.

In addition to the examples provided above, the present invention may use location criteria, distance criteria, or installed distance information from a database to perform connection to nearby devices first, speeding network initialization by effectively communicating first with devices having a higher probability of permitted connection. In addition, measurements of signal strength—received signal strength indication (RSSI) may be used to determine connection order, reduce the distance measurement time or further verify the measured distance.

RSSI measurement may also be used to adjust the transmit power and hand-over algorithms when a device is in transit between connection (master) nodes. Distance measurement can be used to determine when to adjust the transmitter power and indicate to the master nodes when to hand off the connection to an attached device, providing a more secure environment when a mobile device is transitioning from a coverage area for one master device to a second master device.

Distance measurement can also be used to provide a "junk filter" that prevents undesirable connections based on preprogrammed rejection perimeters or locations. A mobile device, for example, may be programmable to set a distance threshold beyond which only known devices can connect, thereby preventing connection to unknown devices beyond a certain distance or outside of a predetermined location map. Two such perimeters may be used, one for known and one for unknown devices, so that a device will not connect with any device beyond an outside perimeter, will connect with only known devices within the outside perimeter but outside of an inner perimeter, and will connect with any device within the inner perimeter. Perimeters may also be programmed such that only devices of a certain type are allowed to connect beyond a specified distance or location map, while devices of any type or another group of types are allowed to connect inside of the specified distance or location map.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for establishing a secure wireless connection between a first wireless device and a second wireless device, said method comprising:
   measuring a radio-frequency communications delay between said second wireless device and at least one other wireless device;
   computing an indication of physical location of said second wireless device with respect to said at least one other wireless device;
   determining whether or not said indication of physical location indicates that connection between said first wireless device and said second wireless device is desirable by comparing said indication of physical location to a predetermined security perimeter, and if said indication of physical location is outside of said predetermined security perimeter, second determining whether or not said second wireless device is a known device; and
   in response to determining that said connection is desirable, initiating said secure wireless connection between said first wireless device and said second wireless device, and wherein said initiating is performed only in response to determining that said second wireless device is a known device when said indication of physical location is outside of said predetermined security perimeter.

2. The method of claim 1, wherein said at least one other wireless device is said first wireless device, wherein said computing computes a distance between said first wireless device and said second wireless device, and wherein said determining determines whether or not said distance indicates that said connection is desirable.

3. The method of claim 2, wherein said comparing compares said distance to a predetermined distance corresponding to an expected distance between said first wireless device and said second wireless device.

4. The method of claim 2, wherein said determining determines that said distance is less than a predetermined security perimeter distance, and said initiating is performed without determining whether or not said second wireless device is a known device.

5. The method of claim 4, wherein said determining determines that said distance is less than a predetermined distance and wherein said initiating is performed automatically in response to placing said first wireless device and said second wireless device within said predetermined distance.

6. The method of claim 1, wherein said at least one other wireless device comprises at least two other wireless devices, wherein said computing computes a triangulated location of said second wireless device in conformity with said radio-frequency communications delay between said two other wireless devices, and wherein said determining determines whether or not said location of said second wireless device indicates that said connection is desirable.

7. The method of claim 6, wherein one of said at least two other wireless devices is said first wireless device, whereby said triangulation is performed between said first wireless device and at least one other wireless device.

8. The method of claim 1, further comprising in response to determining that said connection is not desirable, alerting a user to a presence of said second wireless device.

9. The method of claim 1, wherein said second wireless device comprises multiple wireless devices and wherein said measuring and computing are performed for said multiple wireless devices.

10. The method of claim 1, wherein said first wireless device is a server, and wherein said determining provides additional security for access to a wireless network.

11. The method of claim 1, wherein said first wireless device is a workstation, and wherein said determining provides additional security for access to said workstation.

12. The method of claim 1, wherein said measuring is performed by receiving and decrypting an encrypted distance measurement signal.

13. The method of claim 1, wherein said secure wireless connection activates a physical access device.

14. The method of claim 1, wherein a non-secure connection exists between said first wireless device and said second wireless device and wherein said determining and initiating are performed in response to a secure transaction request from one of said first wireless device or said second wireless device.

15. The method of claim 1, further comprising adjusting a power level of transmissions associated with said connection in conformity with said indication of physical location, whereby security of said connection is improved.

16. The method of claim 1, wherein said connection represents a connection hand-off of a connection between a connected device and said second wireless device for hand-off from said connected device to said first wireless device, and further comprising determining whether or not to accept said hand-off in conformity with said indication of physical location.

17. A method for establishing a secure wireless connection between a first wireless device and a second wireless device, said method comprising:
   measuring a radiofrequency communications delay between said second wireless device and at least one other wireless device;
   computing an indication of physical location of said second wireless device with respect to said at least one other wireless device;
   providing a display of said indication of physical location of said second wireless device to a user;
   determining whether or not said indication of physical location indicates that connection between said first wireless device and said second wireless device is desirable; and
   in response to determining that said connection is desirable and further in response to receiving a user input confirming that connection to said second wireless device is desirable, initiating said secure wireless connection between said first wireless device and said second wireless device.

18. A method for establishing a secure wireless connection between a first wireless device and multiple other second wireless devices, said method comprising:
   measuring a radiofrequency communications delay between said multiple other wireless devices and at least one other third wireless device;
   determining signal strengths of signals received from said second wireless devices;
   computing indications of physical location of said second wireless devices with respect to said at least one other third wireless device;
   determining whether or not said indication of physical location indicates that connection between said first wireless device and said second wireless devices is desirable; and
   in response to determining that said connection is desirable, initiating said secure wireless connection between said first wireless device and said second wireless devices, and wherein said measuring and computing are performed in order of decreasing signal strength, whereby a time of said initiating is reduced for said multiple devices.

19. A method for establishing a secure wireless connection between a first wireless device and multiple other second wireless devices, said method comprising:
   measuring a radiofrequency communications delay between said multiple other wireless devices and at least one other third wireless device;
   computing indications of physical location of said second wireless devices with respect to said at least one other third wireless device;
   determining whether or not said indication of physical location indicates that connection between said first wireless device and said second wireless devices is desirable; and
in response to determining that said connection is desirable, initiating said secure wireless connection between said first wireless device and said second wireless devices; and
   providing a list of said multiple second wireless devices to a user, said list including said computed indications of physical location, whereby said user may view a number of said multiple second wireless devices and their corresponding physical location indications.

20. The method of claim 19, wherein said list is displayed in order of increasing distance, whereby selection of nearby devices is facilitated.

21. A method for establishing a secure wireless connection between a first wireless device and a second wireless device, said method comprising:
   measuring a radiofrequency communications delay between said second wireless device and at least one other wireless device;
   computing an indication of physical location of said second wireless device with respect to said at least one other wireless device;
   determining whether or not said indication of physical location indicates that connection between said first wireless device and said second wireless device is desirable by comparing said indication of physical location to a predetermined security perimeter, and if said indication of physical location is outside of said predetermined security perimeter, second determining whether or not said second wireless device is of a type within a set of predetermined types; and
   in response to determining that said connection is desirable, initiating said secure wireless connection between said first wireless device and said second wireless, and wherein said initiating is performed only in response to determining that said second wireless device is of a type within said set.

22. A wireless network comprising:
a first wireless communications device;
at least one other wireless communications device, including a measurement sub-system for measuring a radio-frequency delay between said at least one other wireless device and a connecting wireless device;

a processing subsystem for computing an indication of a physical location of said connecting wireless device in conformity with said measured delay; and a security subsystem for determining whether or not a connection between said first wireless device and said connecting wireless device is desirable in conformity with said indication of physical location, and wherein said security subsystem further includes means for providing a display of said indication of physical location of said connecting wireless device to a user.

23. The wireless network of claim 22, wherein said at least one other wireless device comprises at least two other wireless devices, wherein said processing subsystem computes a triangulated location of said connecting wireless device in conformity with said radio-frequency communications delay between said two other wireless devices, and wherein said security subsystem determines whether or not said location of said connecting wireless device indicates that said connection is desirable.

24. The wireless network of claim 23, wherein one of said at least two other wireless devices is said first wireless device, whereby said triangulation is performed between said first wireless device and at least one other wireless device.

25. The wireless network of claim 22, further comprising means for receiving a user input confirming that connection to said connecting wireless device is desirable, and wherein said security subsystem permits connection of said first wireless device with said connecting wireless device in conformity with said user input.

26. The wireless network of claim 22, wherein said security subsystem further provides an alert in response to determining that connecting to said connecting wireless device is undesirable.

27. The wireless network of claim 22, wherein said means for providing a display displays a list of multiple wireless devices to a user, said list including said computed indications of physical location provided by said measurement subsystem, whereby said user may view a number of said multiple devices and their corresponding physical location indications.

28. The wireless network of claim 27, wherein said list is displayed in order of increasing distance, whereby selection of nearby devices is facilitated.

29. The wireless network of claim 22, wherein said first wireless device is a server, and wherein said security subsystem provides additional security for access to a wireless network.

30. The wireless network of claim 22, wherein said first wireless device is a workstation, and wherein said security subsystem provides additional security for access to said workstation.

31. A wireless network comprising:

a first wireless communications device;

at least one other wireless communications device, including a measurement sub-system for measuring a radio-frequency delay between said at least one other wireless device and a connecting wireless device;

a processing sub-system for computing an indication of a physical location of said connecting wireless device in conformity with said measured delay; and a security subsystem for determining whether or not a connection between said first wireless device and said connecting wireless device is desirable in conformity with said indication of physical location, wherein said first wireless device further comprises a signal strength measuring circuit coupled to said measurement subsystem for measuring a signal strength of signals received from multiple wireless devices, and wherein said measurement subsystem measures said multiple wireless devices in order of decreasing signal strength, whereby connection time is reduced for said multiple devices.

* * * * *